Jan. 6, 1925.
E. E. HILLYER
1,521,769
HEADLIGHT
Filed Jan. 5, 1923
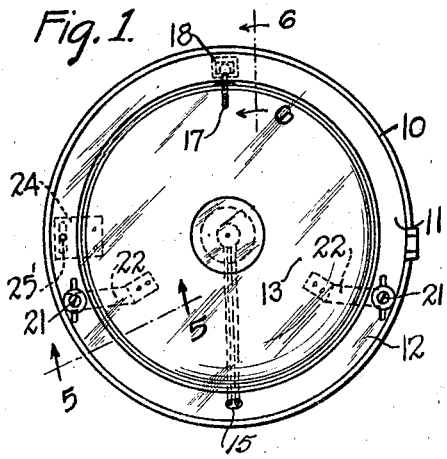
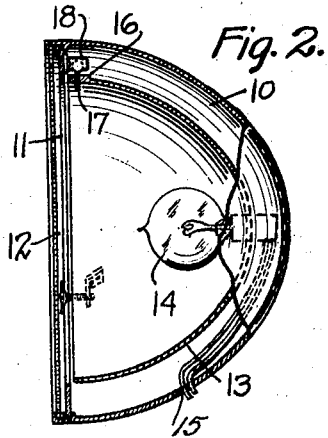
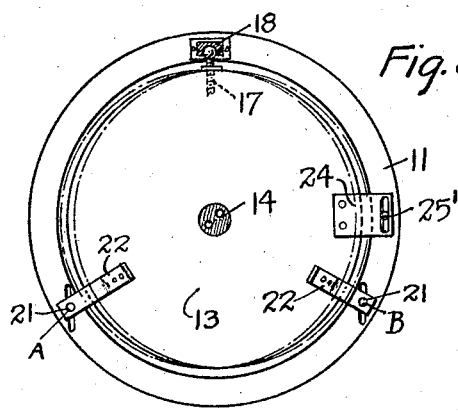
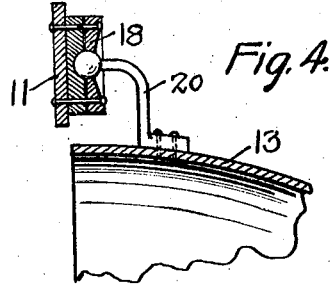
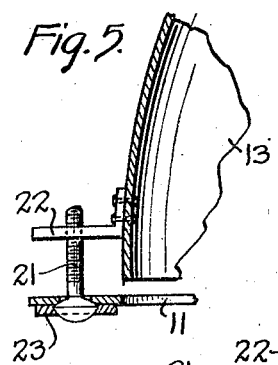
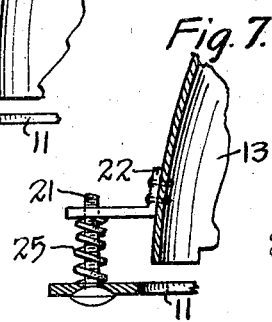
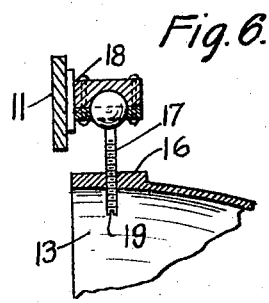
Inventor
Ernest E. Hillyer
By his Attorney
Maurice Block Patented Jan. 6, 1925.

1,521,769

UNITED STATES PATENT OFFICE.

ERNEST E. HILLYER, OF PORT RICHMOND, NEW YORK.

HEADLIGHT.

Application filed January 5, 1923. Serial No. 610,765.

*To all whom it may concern:*

Be it known that I, ERNEST E. HILLYER, a citizen of the United States of America, residing at Port Richmond, Richmond County, State of New York, have invented certain new and useful Improvements in Headlights, of which the following is a specification.

This invention relates to improvements in motor vehicle headlights and in particular to a lamp in which the reflector will be adjustable to vary the direction of throw of the light beam.

In the different States, various laws are in effect concerning where light is required, for instance one State may require more light upon the road at each side of the front of the vehicle than another and one may require the beam of light to strike the ground within a certain distance from the front of the vehicle. Therefore, in order for the motorist to have at his disposal headlights which may be adjusted to meet the laws of the various States, I have embodied in the headlight, a reflector which can be adjusted to throw the light any place upon the road forward of the vehicle.

In the drawing which forms part of this specification:—

Fig. 1 is a front view of a headlight embodying my improvement;

Fig. 2 is a side elevation partly in section showing the inner reflector and its adjustments;

Fig. 3 is a rear view of the headlight;

Fig. 4 is an enlarged section taken through the ball and socket joint which constitutes the top suspension point of the reflector relatively to the frame;

Fig. 5 is an enlarged section taken on line 5—5 of Fig. 1, showing one of the adjusting connections between the lower part of the reflector and the frame;

Fig. 6 is an enlarged section taken on line 6—6 of Fig. 1 showing a ball and socket modification having the same function as that illustrated in Fig. 4;

Fig. 7 is a section similar to Fig. 6 in which a coil spring is used to prevent longitudinal movement of the adjusting screw.

Referring more particularly to the drawings, 10 indicates a lamp casing which may be of any desired shape and which may be suitably mounted to the front of a motor vehicle. The casing 10 is shaped to hold in its open end a supporting ring 11 and forwardly thereof, a suitable hinged lens holding door 12 common to automobile headlight lamps. The lens is preferably arranged so that it may be swung open thereby affording access to the supporting ring 11.

This ring supports at three spaced points a parabolic reflector 13 which contains at its center the light bulb 14, the wires from which project through a suitable opening 15 in the rear of the casing 10.

At the top center of the reflector 13 there is provided a thickened portion 16 which forms a boss and through which passes a threaded stud 17, the upper end of which forms the ball portion of a ball and socket joint denoted generally by 18, the socket part thereof being suitably fastened to the supporting ring 11 as by rivets or welding.

The lower end of the stud 17 projects within the reflector 13 and is slotted as at 19 so that the stud may be revolved with a screwdriver to raise or lower the reflector relatively to the ring 11.

In the form shown in Fig. 4, the stud 17 is replaced by a bracket 20 suitably secured to the upper exterior side of the reflector 13, and bent at its upper to join the ball of the ball and socket connection. This connection provides for a universal movement of the reflector relatively to the ring 11 and in order to move the reflector to any necessary position to cast the light beam in any direction, I provide adjusting screws 21 situated in the slots on the ring 11 and extending rearwardly to engage the brackets 22 which are suitably secured to the exterior opposite sides of the reflector below the center thereof. The rounded slotted heads of the screws are retained in position against the countersunk front face of the ring 11 by washers 23 which are welded or soldered to the ring. This arrangement maintains the brackets 22 at whatever distance from the ring 11 they are adjusted to by the turning of screws 21. The same effect is obtained by using a coil spring 25 (see Fig. 7).

In order to prevent side sway or undue oscillation of the reflector 13, I provide on the latter a slotted plate 24, in the slot of which is disposed a pin 25′ fastened in the ring 11. The plate therefore prevents undesirable side swing of the reflector in any direction as the slot is wide enough to allow of a sufficient movement of the reflector in any direction.

By very slight adjustments then, it is possible to throw the light beams sidewise and up or down depending upon the law governing the throw of headlights in the State where the motorist happens to be. For instance, should it be necessary to throw the light beam to the left; assuming we are behind the lamp as in Fig. 3, the screw A would be turned to draw the adjacent edge of the reflector towards the ring 11 and simultaneously screw B would be turned to move the adjacent edge of the reflector away from the ring without moving the reflector out of the vertical position. Therefore the reflector swivels on its ball and socket connection and the light is accordingly thrown to the left. The opposite operation of the screws would cause the beam of light to be thrown to the right. If the two screws are used to draw the reflector forwardly, then of course the light beam would be raised as the reflector would swing about its ball and socket connection. Moving the lower part of the reflector rearwardly casts the beam of light downwardly.

With my improved arrangement, it will be noted that the necessary adjustments may be made without removing the casing and in fact the invention contemplates the location of the various adjusting elements whereby the necessary adjustments may be made by simply opening the lens of the lamp.

By means of my adjustable features, the position of the casing is entirely immaterial and I can adjust the reflector to meet any requirements within reason.

What I claim is:—

1. In a headlight, a casing, a ring member in said casing, a reflector in said casing, a lamp carried by said reflector, a screw stud having a ball and socket connection to said ring, the stud passing through the upper part of said reflector whereby a revolving movement of the stud will produce a lowering or raising of the reflector, extensions on opposite sides of the reflector adjacent the lower part thereof, and screw members passing through the ring and through said extensions whereby rotary and tilting movement may be imparted to said reflector to throw a beam of light in any desired direction.

2. In a headlight, a casing, a ring member in said casing, a reflector in said casing, a threaded stud passing through the top of the reflector and having a ball end thereon, means for retaining the ball end of the stud in association with the ring whereby the reflector will be suspended, adjusting screws in the ring, brackets on the side of the reflector through which said studs pass, springs between said brackets and the ring whereby when the screws are adjusted to revolve or tilt the reflector the springs will steady the reflector relatively to the ring, and the ring having slots therein through which the adjusting screws pass whereby any upward or downward movement of the reflector will be permitted, without altering the distance between the edge of the reflector and the ring.

In testimony whereof I hereunto affix my signature.

ERNEST E. HILLYER.